Patented July 18, 1950

2,515,307

UNITED STATES PATENT OFFICE 2,515,307

TREATMENT OF CRUDE RUBBER

Frederick M. Lewis, Passaic, and Kenneth W. Doak, Nutley, N. J., assignors to United States Rubber Company, New York, N. Y., a corporation of New Jersey No Drawing. Application April 30, 1948, Serial No. 24,416

6 Claims. (Cl. 260—761)

This invention relates to improvements in the art of reducing the viscosity, i. e., decreasing the resistance to flow, of crude natural rubber, particularly raw, unvulcanized Hevea rubber, prior to the usual processes of manufacturing rubber goods therefrom.

Crude natural rubber is often first broken down on the mill so as to facilitate the incorporation of desired compounding and vulcanizing ingredients, and also to make easy certain mechanical operations such as milling, extrusion, etc.

Heretofore, raw natural rubber has been subjected to long and/or intensive milling or malaxation, at elevated temperatures such as 220° F., in order to lower its viscosity and achieve a satisfactory degree of plasticity so as to render it more amenable to compounding. This has necessitated a very large investment in mills and similar machinery as well as in the power facilities for their operation. Moreover, the time required to convert the raw rubber to the finished article, e. g., an automotive tire, was thereby augmented. Now as a result of our discovery, the above-mentioned disadvantages can be minimized and new economies in the fabrication of rubber articles can be achieved.

An object of this invention is to provide a process whereby the conventional milling of the raw rubber prior to compounding can be minimized or completely eliminated. A further object of this invention is to provide an efficient and economical procedure whereby to produce a soluble vulcanizable rubber (directly from the crude rubber in the absence of diluents) of optimum viscosity, i. e., at least 10 (Mooney), for compounding with vulcanizing agents and adjuncts. Other objects will be apparent from the hereinafter description.

According to the invention, the solid mass of crude rubber is exposed successively to ketene ($CH_2$:CO) vapor and oxygen gas or concurrently to the two gases, that is, to a mixture of the ketene vapor and oxygen. The solid rubber thereby undergoes such a marked reduction in viscosity or resistance to flow that the resulting soluble product needs comparatively little milling, or even no milling, to ready it for compounding with various addends, such as fillers and vulcanizing agents. The present result is surprising because it has been found that when ketene is condensed to liquid form at very low temperatures on solid raw rubber and the mixture warmed, say to 20° C., the rubber becomes insoluble and at the same time it has been found to have combined approximately 1% of oxygen.

In the practice of our invention, raw, unvulcanized solid natural rubber in the form of slabs, sheets, bales, blocks, chunks, etc., is contacted in a suitable container or other device, with from 0.01 to 10%. preferably 0.1 to 1.0% (by weight based on the rubber), each of gaseous ketene and oxygen, either successively in that order or concurrently; approximately equimolar amounts of the ketene and oxygen are economical and convenient. The reaction is carried out at from 25° to 200° C., preferably in the range 60°–150° C., and for times which are usually in the range of from 1 to 24 hours, and more frequently from 0.5 to 2 hours. The pressures may vary from subatmospheric to superatmospheric pressures. The reduction in the viscosity of the rubber is further promoted by the use of the larger amounts of ketene and oxygen, the higher temperatures and/or the longer reaction times within the ranges cited above. Thus, by the method of our invention, it is entirely feasible to reduce the viscosity of raw rubber from a Mooney viscosity of about 80 (at 100° C.) to that of a soluble vulcanizable rubber of Mooney 12, with little or no significant amount of milling.

The Mooney Shearing Disc Plastometer is described by M. Mooney in Industrial and Engineering Chemistry (Anal. Ed.) 6, 147 (1934). By this device, the viscosity may be readily and quantitatively measured. The viscosity readings herein are viscosity readings after four minutes between platens of the instrument at 212° F., a one minute warm-up period being used. The readings are based on an arbitrary standard, the lower the reading, the lower the viscosity.

The contact between the solid rubber and the gaseous ketene and oxygen can be effected in various ways. One convenient method comprises exposing the rubber, preferably in the form of thin (⅛"–¼") sheets or slabs to an atmosphere of ketene and oxygen (or air). Means can also be provided for circulating and recirculating the ketene and oxygen over the rubber. Where the rubber is employed in the form of thick blocks or chunks, the reactant gases diffuse more slowly through the rubber, with the result that the surfaces and sub-surface of the rubber mass undergo a somewhat greater decrease in viscosity than does the interior. This, however, constitutes no great disadvantage and can be rectified, for applications requiring the ultimate in homogeneity, by milling briefly, e. g., 1 minute at 220° F. Another method involves exposure of the rubber to an atmosphere of gaseous ketene and subsequent milling of the treated rubber in air or oxygen. Alternatively, the rubber can be milled or masticated, e. g., in a Banbury mixer, in an atmosphere of gaseous ketene and oxygen. Marked reductions in viscosity can also be achieved by milling the rubber with the lower polymers of ketene, e. g., dimeric ketene, in the presence of air or oxygen.

The desirably low viscosity rubbers so quickly and easily obtainable by our method are ideally adapted to the quick and uniform dispersion therein of vulcanizing agents, accelerators, antioxidants and fillers such as carbon black. Incorporation of carbon black into the rubber of our process in many cases is accompanied by a markedly smaller degree of the stiffening commonly associated with this operation. The compounded rubber can then be fabricated by molding, calendering, etc., and cured in the conventional manner.

The following examples disclose our invention in more detail; parts are by weight.

*Example 1*

Eighty-two grams of raw rubber (Mooney 92 at 100° C.) are sheeted out to form a ⅛″ thick sheet. The sheeted material (Mooney 78) is cut into short lengths and placed in a closed vessel of approximately 5 liters capacity. The air in the vessel is exhausted and a 50:50 mixture (by volume) of ketene and oxygen is then admitted until a pressure of 1 atmosphere is attained in the vessel. The vessel is then warmed at about 60° C. for approximately 16 hours during which time the rubber softens perceptibly and develops a tacky appearance. This rubber is readily soluble in benzene and has a Mooney viscosity of 12.

*Example 2*

About 453 g. of raw rubber (Mooney 92 at 100° C.) are sheeted out into ¼″ slabs (Mooney 83) and enclosed in a 9-liter vessel containing a 50:50 mixture (by volume) of oxygen and ketene. After 16 hours at 25° C., the vessel is warmed to 60° C. for 4.5 hours. At the end of this time the pressure in the vessel has dropped from 1.0 atmosphere to about 0.66 atmosphere. The rubber is perceptibly tacky, and is found to have a Mooney viscosity of 52. A control sample of the untreated rubber is milled at 220° F. for 40 minutes before a Mooney viscosity of 58 can be attained.

Both the treated and untreated rubber samples are then compounded with carbon black, sulfur, and vulcanization accelerators and cured for various periods, viz., 30, 45, and 60 minutes at 45 lbs. of steam. Tests on the cured stocks, e. g., tensile, free sulfur, etc., indicate that the process of our invention has not significantly impaired the properties of the final cured proluctis.

*Example 3*

Twenty-nine grams of polymerized ketene which consists mainly of dimeric ketene are milled into 500 g. of raw rubber (Mooney 92 at 100° C.) at 220° F. in the presence of air for 10 minutes, at which time a Mooney viscosity of 53 is obtained. Thirty minutes of additional milling yields a rubber of Mooney 33. Upon milling another sample of the rubber in the absence of polymerized ketene, a Mooney viscosity of 77 is attained at the end of 10 minutes, and 30 minutes of additional milling only achieves a Mooney viscosity of 58.

The treated rubber is readily cured in the manner of Example 2.

*Example 4*

(a) Thirty grams of raw rubber (Mooney 84) in the form of ⅛″ sheets are enclosed in a tube of about 800 ml. capacity filled with pure oxygen to a pressure of 1 atmosphere (15 p. s. i.) at 25° C. The sealed tube is heated for 1 hour at 125° C., after which the treated rubber is milled in air at about 220° F. for 14 minutes at which time the rubber had a Mooney viscosity of 67.

(b) Repetition of 4(a) using ketene in place of oxygen in the reaction tube yielded a rubber of Mooney 25 after 12 minutes' milling.

(c When 4(a) is repeated using a 1:2 (by volume) mixture of ketene and oxygen, the treated rubber has a Mooney of 33. When the ketene-oxygen ratio is 1:1 by volume, the resulting rubber has a Mooney of 28.

Having thus described our invention, what we claim and desire to protect by Letters Patent is:

1. A method of reducing the viscosity of crude natural rubber which comprises contacting solid unvulcanized natural rubber with 0.01 to 10%, by weight of the rubber, of ketene vapor and with oxygen at a temperature in the range from 25° C. to 200° C., until the mass on test shows a viscosity (Mooney) substantially below that which the same mass would have if subjected to the same conditions but in the absence of the treatment with the ketene.

2. A method of reducing the viscosity of crude natural rubber which comprises contacting solid unvulcanized natural rubber with 0.01 to 10%, by weight of the rubber, of ketene vapor and with oxygen at a temperature in the range from 25° C. to 200° C., until the mass on test shows a viscosity (Mooney) substantially below that which the same mass would have if subjected to the same conditions but in the absence of the treatment with the ketene, and subsequently milling the rubber mass to further reduce its resistance to flow.

3. A method of reducing the viscosity of crude natural rubber which comprises successively exposing the solid rubber mass to contact with 0.01 to 10%, by weight of the rubber, of gaseous unsubstituted ketene and to oxygen.

4. A method of reducing the viscosity of crude natural rubber which comprises successively exposing the solid rubber mass to contact with 0.01 to 1%, by weight of the rubber, of gaseous unsubstituted ketene and to oxygen.

5. A method of reducing the viscosity of crude natural rubber which comprises successively exposing the solid rubber mass to contact with 0.01 to 10%, by weight of the rubber, of gaseous unsubstituted ketene and to oxygen, and milling the solid rubber mass during the time it is exposed to oxygen.

6. A method of reducing the viscosity of crude natural rubber which comprises exposing the solid rubber mass to contact with 0.1 to 1%, by weight of the rubber, of gaseous unsubstituted ketene and afterwards milling the solid rubber mass in the presence of oxygen.

FREDERICK M. LEWIS.
KENNETH W. DOAK.

REFERENCES CITED

The following references are of record in the file of this patent:

UNITED STATES PATENTS

| Number | Name | Date |
| --- | --- | --- |
| 2,095,673 | Minor | Oct. 12, 1937 |
| 2,227,957 | Busse | Jan. 7, 1941 |

OTHER REFERENCES

J. Chem. Society of 1945, pp. 244–245.